United States Patent [19]

Zeigler et al.

[11] 4,359,264
[45] Nov. 16, 1982

[54] ANTIGLARE REAR VIEW MIRROR ASSEMBLY

[75] Inventors: Philip B. Zeigler, Clearwater, Fla.; David W. Moore, Anderson, Ind.

[73] Assignee: General Motors Corporation, Detroit, Mich.

[21] Appl. No.: 249,194

[22] Filed: Mar. 30, 1981

[51] Int. Cl.³ .......................... G02B 7/18; B60R 1/04
[52] U.S. Cl. ................................. 350/281; 248/484
[58] Field of Search ............... 350/279, 280, 281, 282; 248/478, 481, 483, 484

[56] References Cited

U.S. PATENT DOCUMENTS

| 2,616,335 | 11/1952 | Mazur | 350/281 |
| 2,631,498 | 3/1953 | Barkley | 350/281 |
| 3,367,616 | 2/1968 | Bausch et al. | 248/483 |

FOREIGN PATENT DOCUMENTS 783543  9/1957  United Kingdom ............... 248/483

*Primary Examiner*—John K. Corbin
*Assistant Examiner*—Matthew W. Koren
*Attorney, Agent, or Firm*—Edward J. Biskup

[57] ABSTRACT

An antiglare rear view mirror assembly which includes a mounting assembly, two parts of which are tubular in configuration and wherein one of the tubular parts of the mounting assembly supports a mirror element and is manually tiltable about a horizontal axis relative to the other of the tubular parts by a rotatable actuator so as to provide selective adjustment of the mirror element between a "day" position and a "night" position.

3 Claims, 8 Drawing Figures

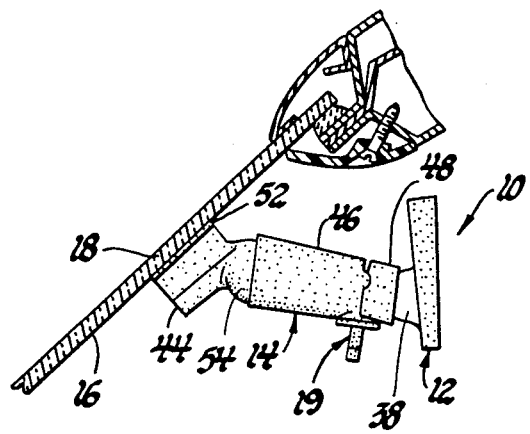
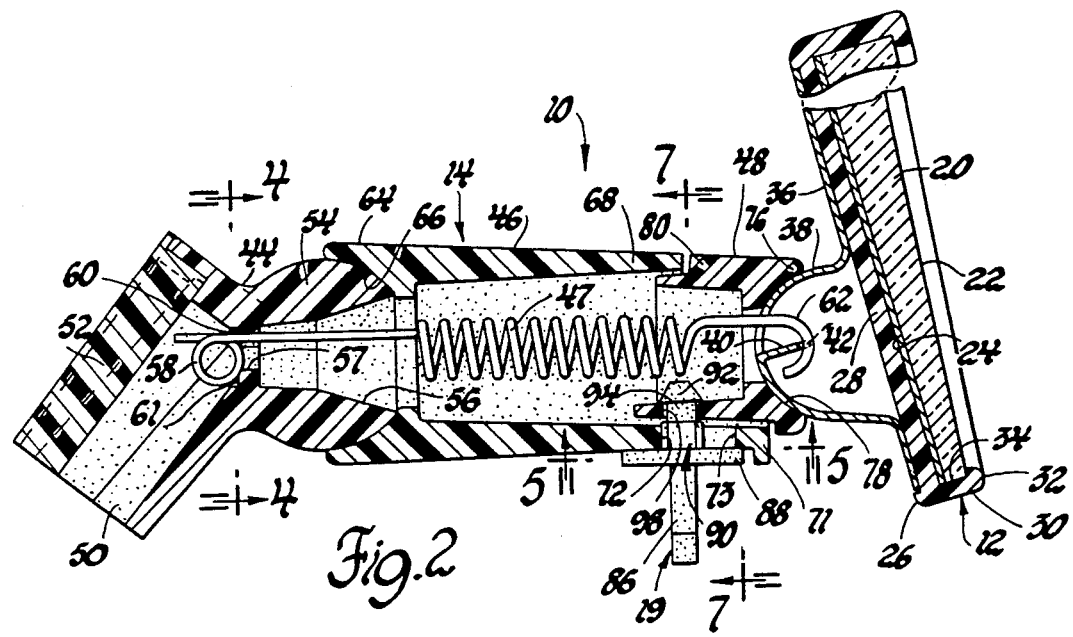
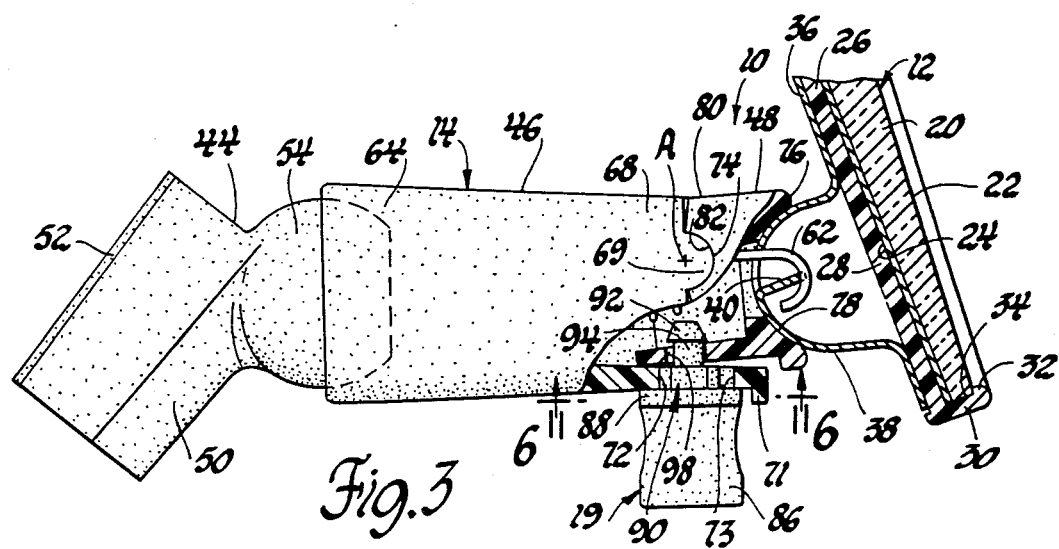

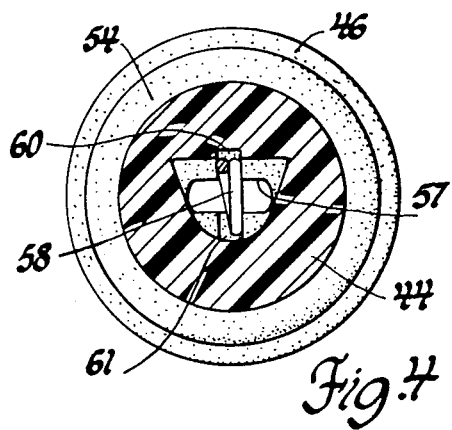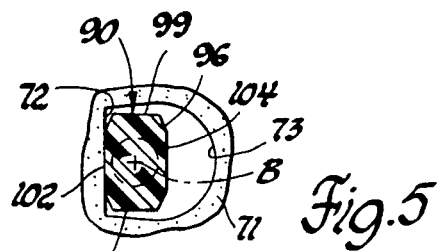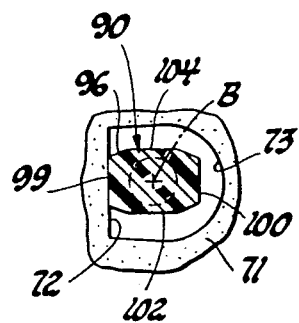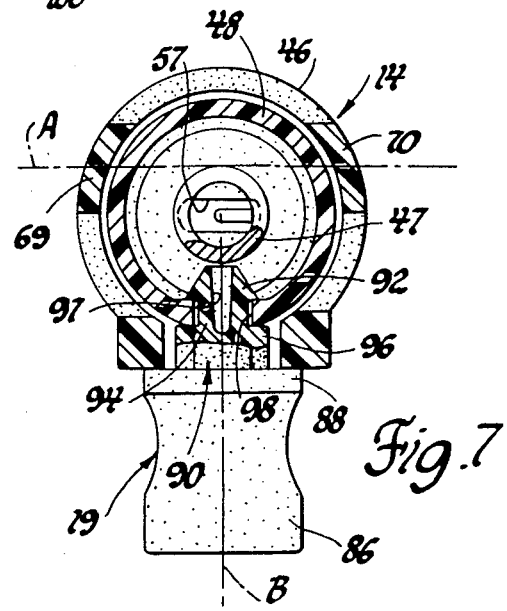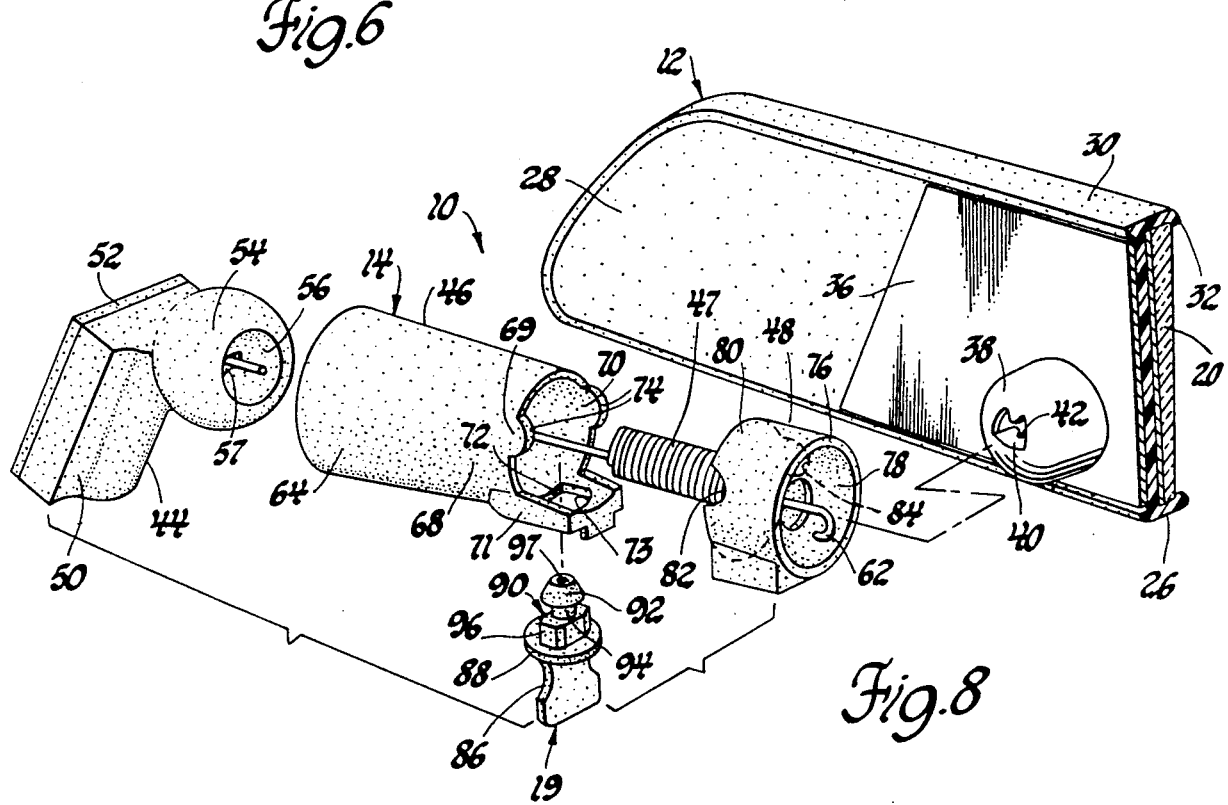

ANTIGLARE REAR VIEW MIRROR ASSEMBLY

This invention concerns an antiglare rear view mirror assembly of the type that includes a prismoidal mirror element having two reflective surfaces of different reflecting powers that are selectively tiltable to present one or the other reflective surface.

Copending patent application Ser. No. 248,716 concurrently filed in the names of Philip B. Zeigler et al and assigned to the assignee of this invention discloses an antiglare rear view mirror assembly which includes a retainer member for the prismoidal mirror element that is adapted to be universally pivotally adjusted about a mounting member secured to the windshield of an automotive vehicle. A spherical member is fixed to the rear surface of the retainer member and is supported by a socket member which engages one end of a support member. Both the socket member and the support member are tubular in configuration and are axially aligned. In addition, the socket member has a projection integrally formed therewith that is located within the support member; and the other end of the support member is formed with a concave spherical bearing surface for mating engagement with the mounting member. The entire antiglare rear view mirror assembly is held together by a spring which extends through the support member and the socket member and is fixed at one end to the spherical member on the retainer member and at the other end to the mounting member. Controlled movement of the retainer member and the mirror element between a "day" position and a "night" position is provided by a pair of cooperating surfaces formed on the support member and the socket member which allow the retainer member to be tilted relative to the support member about a horizontal axis between the "day" position—wherein one of the reflective surfaces of the mirror element is presented to the viewer, and the "night" position wherein the other of the reflective surfaces of the mirror element is presented to the viewer. In addition, the projection formed with the socket member engages a portion of the interior surface of the support member and, together with the spring, serves to maintain the retainer member, and accordingly the mirror element, in either the "day" position or the "night" position.

The antiglare rear view mirror assembly of the present invention is similar to the above-described mirror assembly, but differs therefrom in that a manually rotatable actuator having a cam member is provided between the socket member and the support member. The actuator has an outer end carried by the support member and the inner end is connected to the socket member in a manner whereby rotation of the actuator causes the retainer member to be tilted relative to the support member about a horizontal axis between the "day" position and the "night" position. In addition, the actuator and the support member are formed with cooperating surfaces which serve to positively position and retain the socket member in the "day" position so as to facilitate manual adjustment of the mirror element when desired.

The objects of the present invention are: to provide a new and improved antiglare rear view mirror assembly which includes a mounting assembly—two parts of which are axially aligned and tubular in configuration, with one of the tubular parts of the mounting assembly being tiltable relative to each other through a rotatable actuator for moving the mirror element from a "day" position to a "night" position, and vice versa; to provide a new and improved antiglare rear view mirror assembly in which the mirror element is connected through a tubular mounting arrangement to a mounting member by a spring under tension which serves to maintain the assembly together, and in which the mounting arrangement carries a rotatable actuator for selectively moving the mirror element between a "day" position and a "night" position; and to provide a new and improved antiglare rear view mirror assembly which includes a tubular mounting arrangement that serves the dual function of supporting the mirror element on a vehicle windshield for universal adjustable movement—as well as providing two-position pivotal movement of the mirror element about a horizontal axis upon rotational movement of an actuator so that the mirror element can assume either a "day" position or a "night" position.

The above and other objects and advantages of the present invention will be apparent when reference is made to the following detailed description and the accompanying drawings, in which:

FIG. 1 is a side elevational view of an antiglare rear view mirror assembly made in accordance with the present invention, and shows the mirror element located in the "day" position;

FIG. 2 is an enlarged cross-sectional view of the antiglare rear view mirror assembly shown in FIG. 1;

FIG. 3 is a view similar to FIG. 2, but shows the mirror element of the antiglare rear view mirror assembly located in the "night" position;

FIG. 4 is a sectional view of the mounting member which forms a portion of the antiglare rear view mirror assembly, and is taken on line 4—4 of FIG. 2;

FIG. 5 is a sectional view taken on line 5—5 of FIG. 2, and shows the position of the cam portion of the actuator when the mirror element is in the "day" position;

FIG. 6 is a sectional view taken on line 6—6 of FIG. 3, and shows the position of the cam portion of the actuator when the mirror element is in the "night" position;

FIG. 7 is a sectional view of the rear view mirror assembly taken on line 7—7 of FIG. 2; and FIG. 8 is an exploded view showing in perspective the various parts of the antiglare rear view mirror assembly of FIGS. 1 through 3.

Referring now to the drawings and more particularly to FIGS. 1 and 2 thereof, an antiglare rear view mirror assembly 10 is shown comprising a mirror assembly 12 connected by a mounting assembly 14 to the inside surface 16 of an automotive vehicle windshield 18. The mounting assembly 14 allows the mirror assembly 12 to be universally adjusted in position relative to the windshield 18. In addition, an actuator 19 is carried by the mounting assembly 14 and serves to selectively move the mirror assembly 12 about a horizontal axis "A" between a "day" position and a "night" position. As is well known, the mirror assembly 12 is placed in the "day" position under conditions of normal visibility, and is placed in the "night" position in order to provide a rearward image of reduced intensity when it is desirable to lessen the headlight glare from a trailing vehicle.

The mirror assembly 12 includes a conventional prismoidal mirror element 20 which, when viewed in cross section as shown in FIG. 2, is generally wedge-shaped. More specifically, the mirror element 20 includes upwardly diverging front and rear reflective surfaces which are identified respectively by the reference numerals 22 and 24. The rear reflective surface 24 is provided with a reflective coating formed by any suitable process, such as aluminizing. With this construction, different reflecting powers are provided by the front reflective surface 22 and the rear reflective surface 24. Preferably, the front reflective surface 22 has an approximate 4% reflectivity, while the rear reflective surface 24 has an approximate 90% reflectivity. Therefore, by selectively positioning the mirror element 20 about the horizontal axis "A" (as hereinafter described), the vehicle operator can present for viewing the reflective surface best suited to his immediate driving requirements.

As best seen in FIG. 2, the mirror element 20 is mounted in a retainer member 26 which is molded from a single piece of suitable plastic material, and generally comprises a vertically orientated base 28 which includes a forwardly projecting peripheral flange 30 that terminates with an inwardly turned rim 32. The flange 30 and rim 32 define a cavity 34 which is slightly smaller in peripheral configuration than the mirror element 20.

In assembly, the mirror element 20 is snapped or pressed into the mirror cavity 34 and securely held therein by virtue of the resiliency of the flange 30 and rim 32. The base 28 of the retainer member 26 is rigidly connected to a metallic support plate 36 which is a stamping with a spherical member 38 formed thereon. The center of the spherical member 38 is pierced so as to provide an inwardly extending tang 40, the terminal end of which is centrally formed with a notch 42, as shown in FIG. 8.

The mounting assembly 14 comprises a mounting member 44, a support member 46, a coil spring 47, and a socket member 48. As best seen in FIGS. 1, 2, and 4, the mounting member 44 has one end thereof formed with a base 50 which is secured to a bracket 52 which, in turn, is attached by an adhesive to the inside surface 16 of the vehicle windshield 18. The other end of the mounting member 44 is formed with a ball portion 54 having a tapered bore 56 therein which connects with a transversely extending and elongated slot 57 also formed in the ball portion 54 (as seen in FIGS. 4 and 7). The rear end 58 of the spring 47 is pig-tail shaped and is adapted to pass through the slot 57 and thereafter rotated 90° and positioned within a pair of vertically aligned wells 60 and 61 located on opposite sides of the slot 57, as seen in FIGS. 2 and 4. The front end 62 of the spring 47 is hook-shaped and is connected to the tang 40 and located in the notch 42 thereof.

The support member 46 takes the form of an elongated hollow tube or cylinder, one end 64 of which is formed with a concave spherical bearing surface 66 which mates with the outer spherical surface of the ball portion 54 of the mounting member 44. The other end 68 of the support member 46 terminates with a pair of horizontally aligned, laterally spaced semicircular projections 69 and 70 which, as shown in FIG. 8, are located above an integral extension member 71 having an opening formed therein defined by a straight end wall 72 and a curved wall 73 (as seen in FIGS. 5 and 6). It will be noted that each of the semicircular projections 69 and 70 has an outer curved surface 74 defined by a circle, the center of which is the above-mentioned horizontal axis "A".

The socket member 48 also takes the form of a hollow tube or cylinder, the front end 76 of which has a concave spherical bearing surface 78 formed therein which receives the spherical member 38 of the support plate 36 so as to allow universal pivotal movement of the mirror element 20 relative to the socket member 48. The rear end 80 of the socket member 48 is formed with a pair of horizontally aligned and laterally spaced semicircular notches 82 and 84 which respectively receive and cooperate with the projections 69 and 70 to permit controlled pivotal movement of the socket member 48 about the horizontal axis "A" for positioning the mirror assembly 12 in the "day" position and in the "night" position, as will be hereinafter explained.

As best seen in FIGS. 5-7, the actuator 19 has a longitudinal center axis "B" and comprises a tab portion 86 integrally formed with a disc portion 88 which, in turn, is rigidly formed with a cam portion 90. The actuator 19 is molded or otherwise formed from any suitable plastic material, with the cam portion 90 thereof including a frustoconical head 92 attached by a cylindrical neck 94 to an oblong cam member 96. The frustoconical head 92 has a tapered well 97 centrally formed therein which allows the frustoconical head 92 to pass through a circular opening 98 formed in the bottom of the socket member 48. Thus, the neck 94 is located within the circular opening 98 with the oblong cam member 96 located within the opening defined by walls 72 and 73 of the extension member 71. The cam member 96 is formed with a first pair of flat parallel surfaces 99 and 100 and a second pair of flat parallel surfaces 102 and 104. The surfaces 102 and 104 are equally spaced from the longitudinal center axis "B" of the actuator 19. Similarly, the surfaces 99 and 100 are equally spaced from the longitudinal center axis "B", but each surface 99 and 100 is spaced farther from the center axis "B" than either of the surfaces 102 or 104. The surfaces 99–104 function as detents for maintaining the socket member 48, and accordingly the mirror assembly 12, in the "day" position and the "night" position—as will now be explained.

In this regard—and as seen in FIGS. 1, 2, and 5, the actuator 19 as well as the socket member 48 and the mirror assembly 12 are located in the "day" position. In this "day" position, the spring 47 causes the socket member 48, acting through the neck 94, to exert a rearwardly directed force on the cam portion 90. As a result, the flat surface 102 of the cam member 96 is pressed into engagement with the end wall 72 of the opening in the extension member 71 and thereby maintains the socket member 48 and the mirror assembly 12 in the "day" position.

In order to place the mirror assembly 12 in the "night" position so that the front reflective surface 22 of the mirror element 20 is presented to the viewer, the tab portion 86 of the actuator 19 is manually rotated 90° in a clockwise direction (as seen in FIG. 5), about its center axis "B" so as to cause the cam member 96 to assume the position shown in FIGS. 3 and 6 wherein the surface 99 is placed into engagement with the end wall 72. As a result, the center longitudinal axis "B", and accordingly the neck 94, are moved away from the end wall 72. Such movement causes the mirror assembly and the socket member 48 to pivot as a unit in a counterclockwise direction about the horizontal axis "A" and to assume the "night" position seen in FIG. 3. The mirror assembly 12 is in the "night" position because of the engagement between the surface 99 on the cam member 96 and the end wall 72 of the extension member 71.

It should be apparent from the above explanation that when the mirror assembly 12 is in the "day" position of FIGS. 2 and 5 and the actuator 19 is rotated 90° in a counterclockwise direction about its longitudinal center axis "B", the other surface 100 will engage the end wall 72 and also position the mirror assembly 12 in the "night" position of FIG. 3. Also, when the actuator 19 is rotated to a position wherein the surface 104 of the cam member 96 is in engagement with the end wall 72, the mirror assembly 12 is located in the "day" position.

Finally, it will be noted that the spherical joint provided by the ball portion 54 of the mounting member 44 and the concave spherical bearing surface 66 of the support member 46—as well as the spherical joint provided by the spherical member 38 formed on the support plate 36, and the spherical bearing surface 78 of the socket member 48, allow the mirror assembly 12 to be manually adjusted to various positions. Adjustable movement of the mirror assembly 12 is facilitated because of the positive positioning of the socket member 48 relative to the support member 46. Thus, when the antiglare rear view mirror assembly 10 is in the "day" position, the mirror assembly 12 can be manually adjusted about the ball portion 54 or the spherical member 38 without altering the position of the actuator 19. Therefore, once the vehicle operator places the mirror assembly 12 in the desired location relative to the mounting member 44, positioning of the mirror assembly 12 between the "day" position and the "night" position can be achieved as hereinbefore described.

Various changes and modifications can be made in this construction without departing from the spirit of the invention. Such changes and modifications are contemplated by the inventors, and they do not wish to be limited except by the scope of the appended claims.

The embodiments of the invention for which an exclusive property or privilege is claimed are defined as follows:

1. An antiglare rear view mirror assembly for an automotive vehicle in which a mirror element having two reflective surfaces of different reflecting power is mounted in a retainer member; a mounting member adapted to be rigidly secured to said automotive vehicle for supporting said rear view mirror assembly; a socket member having a tubular configuration; a support member having a tubular configuration with one end thereof formed with a bearing surface for mating engagement with said mounting member and the other end thereof serving to support one end of said socket member for pivotal movement about a horizontal axis which extends transversely to the longitudinal axis of said support member; a spring extending through said support member and said socket member and having one end thereof fixed to said mounting member and the other end thereof fixed to said retainer member for connecting said retainer member to the other end of said socket member and for maintaining said mounting member in said mating engagement with said bearing surface on said one end of said support member; and a rotatable actuator between said socket member and said support member for pivoting said socket member about said horizontal axis between a "day" position to present one of said reflective surfaces of said mirror element to the viewer, and a "night" position to present the other of said reflective surfaces of said mirror element to the viewer; said actuator having detent means coacting with said spring for maintaining said socket member in said "day" position and in said "night" position.

2. An antiglare rear view mirror assembly for an automotive vehicle in which a mirror element having two reflective surfaces of different reflecting power is mounted in a retainer member; a spherical member attached to said retainer member; a mounting member adapted to be rigidly secured to said automotive vehicle for supporting said rear view mirror assembly; a socket member; a support member having one end thereof formed with a spherical bearing surface for mating engagement with said mounting member and the other end thereof formed with means for supporting one end of said socket member for pivotal movement about a horizontal axis which extends transversely to the longitudinal axis of said support member; a spring extending through said support member and said socket member and having one end thereof fixed to said mounting member and the other end thereof fixed to said spherical member for maintaining said spherical member in engagement with the other end of said socket member and for maintaining said mounting member in engagement with said spherical bearing surface; an actuator supported for rotation about a vertical axis and being located between said socket member and said support member for pivoting said socket member about said longitudinal axis between a "day" position to present one of said reflective surfaces of said mirror element to the viewer, and a "night" position to present the other of said reflective surfaces of said mirror element to the viewer; said actuator having detent means formed thereon coacting with said spring for maintaining said socket member in said "day" position and in said "night" position.

3. An antiglare rear view mirror assembly for an automotive vehicle in which a mirror element having two reflective surfaces of different reflecting power is mounted in a retainer member; a spherical member attached to said retainer member; a mounting member adapted to be rigidly secured to said automotive vehicle for supporting said rear view mirror assembly; a socket member having a tubular configuration with one end thereof formed with a pair of angularly related surfaces; a support member having a tubular configuration with one end thereof formed with a spherical bearing surface for mating engagement with said mounting member and the other end thereof formed with means for supporting said one end of said socket member for pivotal movement about a horizontal axis which extends transversely to the longitudinal axis of said support member; a spring extending through said support member and said socket member and having one end thereof fixed to said mounting member and the other end thereof fixed to said spherical member for maintaining said spherical member in engagement with the other end of said socket member and for maintaining said mounting member in engagement with said spherical bearing surface; said one end of said socket member and said other end of said support member each being formed with an opening; an actuator supported for rotation within said opening in said one end of said socket member and having a cam member located in said opening in said other end of said support member; a pair of radially spaced surfaces formed on said cam member and, upon rotation of said actuator, coacting with said other end of said support member for pivoting said socket member between a "day" position to present one of said reflective surfaces of said mirror element to the viewer, and a "night" position to present the other of said reflective surfaces of said mirror element to the viewer.

* * * * *